(12) United States Patent
Tolia et al.

(10) Patent No.: US 9,178,860 B2
(45) Date of Patent: Nov. 3, 2015

(54) OUT-OF-PATH, CONTENT-ADDRESSED WRITES WITH UNTRUSTED CLIENTS

(71) Applicant: Maginatics, Inc., Mountain View, CA (US)

(72) Inventors: Niraj Tolia, Sunnyvale, CA (US); Diwaker Gupta, San Francisco, CA (US); Andrew Gaul, San Francisco, CA (US)

(73) Assignee: Maginatics, Inc., Mountain View, CA (US)

( * ) Notice: Subject to any disclaimer, the term of this patent is extended or adjusted under 35 U.S.C. 154(b) by 0 days.

(21) Appl. No.: 13/973,270

(22) Filed: Aug. 22, 2013

(65) Prior Publication Data

US 2015/0058935 A1     Feb. 26, 2015

(51) Int. Cl.
*H04L 29/06*     (2006.01)

(52) U.S. Cl.
CPC ............... *H04L 63/08* (2013.01); *H04L 63/108* (2013.01)

(58) Field of Classification Search
CPC .. H04L 9/3213; H04L 9/3228; H04L 63/0807
USPC ............................................. 726/4; 707/692
See application file for complete search history.

(56) References Cited

U.S. PATENT DOCUMENTS

| | | | | |
|---|---|---|---|---|
| 8,396,841 | B1 * | 3/2013 | Janakiraman | 707/692 |
| 8,601,473 | B1 * | 12/2013 | Aron et al. | 718/1 |
| 2010/0306175 | A1 * | 12/2010 | Johnson et al. | 707/663 |
| 2012/0166403 | A1 * | 6/2012 | Kim et al. | 707/692 |
| 2013/0339317 | A1 * | 12/2013 | Kim et al. | 707/692 |
| 2014/0143213 | A1 * | 5/2014 | Tal et al. | 707/692 |
| 2014/0297603 | A1 * | 10/2014 | Kim et al. | 707/692 |

\* cited by examiner

*Primary Examiner* — Justin T Darrow
*Assistant Examiner* — Hee Song
(74) *Attorney, Agent, or Firm* — Krishnendu Gupta

(57) ABSTRACT

A method in data storage involves receiving at a metadata server from a client device a BEGIN_WRITE request identifying data to be written by hashes, consulting, by the metadata server a deduplication table to determine historical nature of the data determined to be written, determining that the data was never previously written, was previously written by another client, or was previously written but failed a verification, sending to the client device write locations with tokens for the data, starting an authentication timer, and authorizing the client device to write directly to the data server using the authentication tokens and the authenticated write locations, determining that the data was previously written by the same client, or that the data was previously written and passed the verification test, notifying the client of this circumstance, and receiving from the client device an END_WRITE request.

3 Claims, 3 Drawing Sheets

OUT-OF-PATH, CONTENT-ADDRESSED WRITES WITH UNTRUSTED CLIENTS

BACKGROUND OF THE INVENTION

1. Field of the Invention

The present invention is in the broad technical area of cloud computing, and pertains more particularly to write operations enabled through a metadata server.

2. Description of Related Art

Cloud computing, wherein users are enabled to read and write data to substantial data repositories, which may be remote and accessed over, for example, a wide area network (WAN), such as the Internet network, and which may also serve a large number of distinct and separate users, are well-known in the art, and the technical area is rapidly growing, attracting new enterprises providing products and services. Many well-known enterprises, like Yahoo, IBM and Amazon, for example, offer cloud computing services which may be utilized by such users.

There are a variety of apparatus and services offered by enterprises engaged in this technical area, and many of the services offered are developed and sold to maximize certain features and to solve certain problems that have been discovered in development. There are, however, at the time of filing the instant application, still many difficulties and problems to be solved. One such difficulty is in controlling and verifying writes to data repositories for what are known in the art as untrusted clients.

What is needed in the art is a method and apparatus to provide out-of-path, content-addressed writes with untrusted clients in a manner that is efficient and that minimizes bandwidth requirements.

BRIEF SUMMARY OF THE INVENTION

In an embodiment of the invention a method in data storage is provided, comprising a metadata server having a processor, and coded instructions executing on the processor from a non-transitory physical medium. The coded instructions provide a process of steps (a) receiving at the metadata server from a client device a BEGIN_WRITE request identifying data to be written by hashes; (b) consulting, by the metadata server a deduplication table to determine historical nature of the data determined to be written; (c) determining in step (b) that the data was never previously written, the data was previously written by another client, or that the data was previously written but failed a verification test, sending by the metadata server to the client device authenticated write locations with a set of authentication tokens for the data, starting an authentication timer, and authorizing the client device to write directly to the data server using the authentication tokens and the authenticated write locations; (d) determining that the data was previously written by the same client, or that the data was previously written and passed the verification test, notifying the client of this circumstance; and (e) receiving from the client device an END_WRITE request.

In one embodiment there is an additional step (f), upon receiving the END_WRITE request, quarantining the data just written, such that subsequent writes by the client device that originally wrote the data can make new references to the data, but writes by other client devices cannot create new references to the data.

In another embodiment there is an additional step (g) in addition to step (f) determining by the metadata server that the authenticated write location timer has timed out, and performing a verification test on the data just written by communication with the data server.

In yet another embodiment there is an additional step (h) in addition to steps (f) and (g), determining if the verification test fails, extending the quarantine for the data.

In yet another embodiment there is an additional step (i) in addition to steps (f), (g) and (h) determining if the verification step passes, lifting the quarantine on the data.

In another aspect of the invention a metadata server in data storage is provided, comprising a processor and coded instructions executing on the processor from a non-transitory physical medium, the coded instructions providing a process of steps: (a) receiving at the metadata server from a client device a BEGIN_WRITE request identifying data to be written by hashes; (b) consulting, by the metadata server a deduplication table to determine historical nature of the data determined to be written; (c) determining in step (b) that the data was never previously written, the data was previously written by another client, or that the data was previously written but failed a verification test, sending by the metadata server to the client device authenticated write locations with a set of authentication tokens for the data, starting an authentication timer, and authorizing the client device to write directly to the data server using the authentication tokens and the authenticated write locations; (d) determining that the data was previously written by the same client, or that the data was previously written and passed the verification test, notifying the client of this circumstance; and (e) receiving from the client device an END_WRITE request.

In one embodiment of the metadata server the process comprises an additional step (f), upon receiving the END_WRITE request, quarantining the data just written, such that subsequent writes by the client device that originally wrote the data can make new references to the data, but writes by other client devices cannot create new references to the data.

In another embodiment of the metadata server the process comprises an additional step (g) in addition to step (f) determining by the metadata server that the authenticated write location timer has timed out, and performing a verification test on the data just written by communication with the data server.

In yet another embodiment of the metadata server the process comprises an additional step (h) in addition to steps (f) and (g) determining if the verification test fails, extending the quarantine for the data.

In yet another embodiment of the metadata server the process comprises an additional step (i) in addition to steps (f), (g) and (h) determining if the verification step passes, lifting the quarantine on the data.

DETAILED DESCRIPTION OF THE INVENTION

Figure 1:
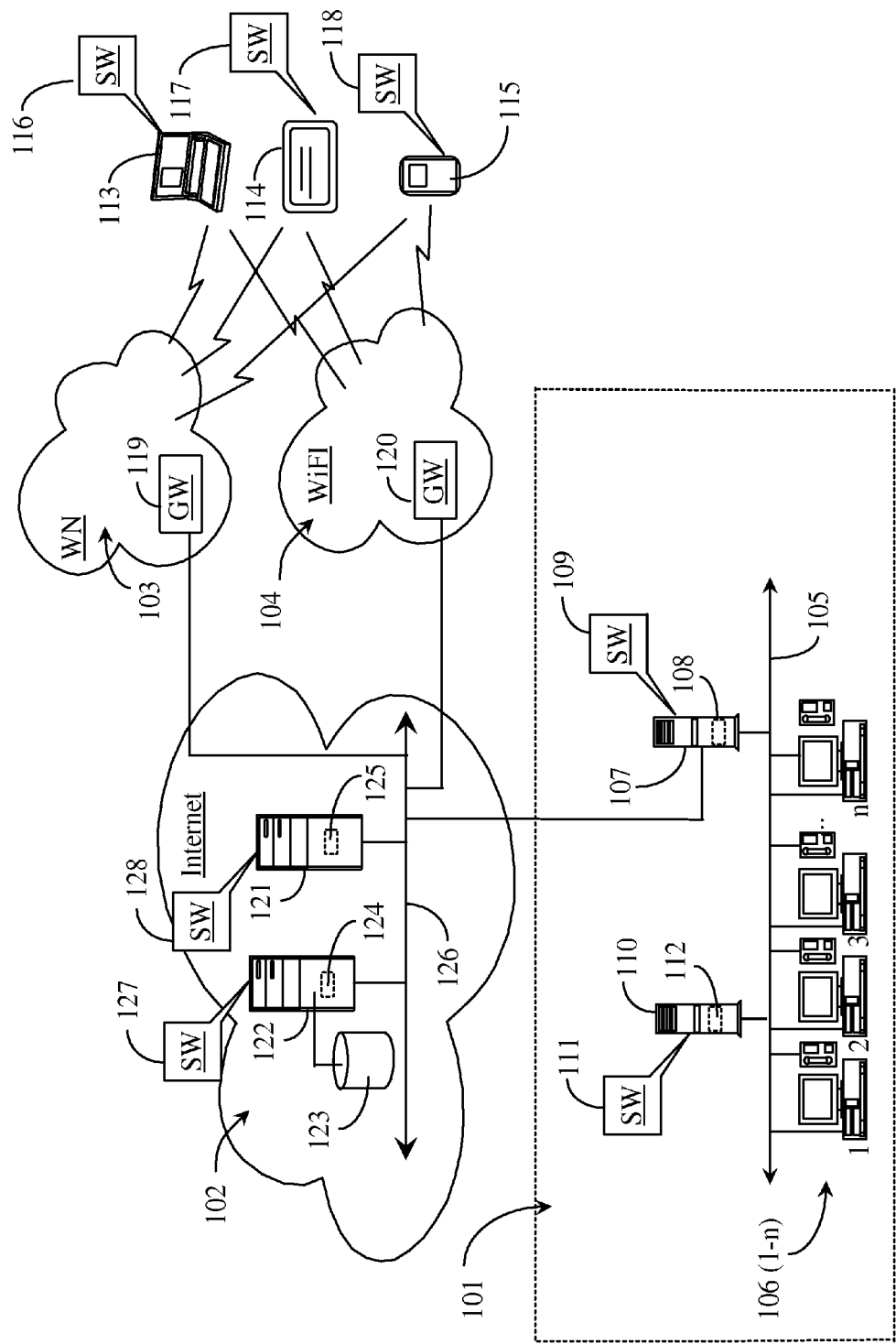
FIG. 1 is an architectural diagram depicting components and functions in an embodiment of the present invention.

FIG. 1 is an architectural diagram depicting components and functions in an embodiment of the present invention. In this example an enterprise 101 is represented as having workstations 106 (1–n) implemented on a Local Area Network (LAN) 105. Individual ones of the workstations may have a computer as shown connected to LAN 105, and one or more telephones. It is the computer that is more pertinent in embodiments of the present invention however. Persons using the computers at the workstations may be involved in composing, editing and storing files and data related to files.

Enterprise 101 also comprises a communication server 107 having a processor 108 executing software (SW) 109, which software provides functions of the server. Server 108 provides connection to backbone 126 of Internet network 102 in this example. Backbone 126 represents all of the myriad connections and interconnections in the Internet network. Enterprise 101 also may comprise a metadata server 110 having a processor 112 providing functions of the metadata server. This metadata server and its function is an important element in embodiments of the present invention, and is described in enabling detail below with reference to other figures. In some embodiments of the invention metadata server may be an Internet connected server 121 in the Internet network as shown in cloud 102. In yet other embodiments the metadata server may be instantiated in another location for enterprise 101, the other location accessible through data connection to location 101 shown. The connection may be through the Internet network or by another data network.

A third party service provider having an Internet-connected server 122 having a processor 124 executing SW 127, which provided functions for server 122, and coupled to a large capacity data repository 123, represents cloud storage services that may be available for enterprises like enterprise 101 to store and retrieve large amounts of data. In some embodiments this data storage facility may not be in the Internet, but may be located at one or another locations of enterprise 101, connected to a LAN like LAN 105, or at some other location.

Mobile computerized devices 113, a laptop computer, 114, a tablet device, and 118, a smart telephone 118, are illustrated as connected wirelessly to either or both of a Wi-Fi network 104 and a cellular wireless network 103. These devices may establish a data connection to Internet backbone 126 through either of gateway 119 or gateway 120, and may also execute data connection to enterprise 101 through Internet 102 and server 107 in Enterprise 101. These devices represent mobile devices that may be used by persons affiliated with enterprise 101 to compose, edit, save and retrieve files and data related to files. Each of these devices executes SW 116, 117 and 118 respectively in this example.

The skilled person will recognize that enterprise 101 may have more servers and functions than illustrated in FIG. 1, depending at least in part on the sort of enterprise. The skilled person will also realize that the configuration of the architecture in FIG. 1 is but one example of a variety of ways that elements might be organized to practice the present invention.

Figure 2:
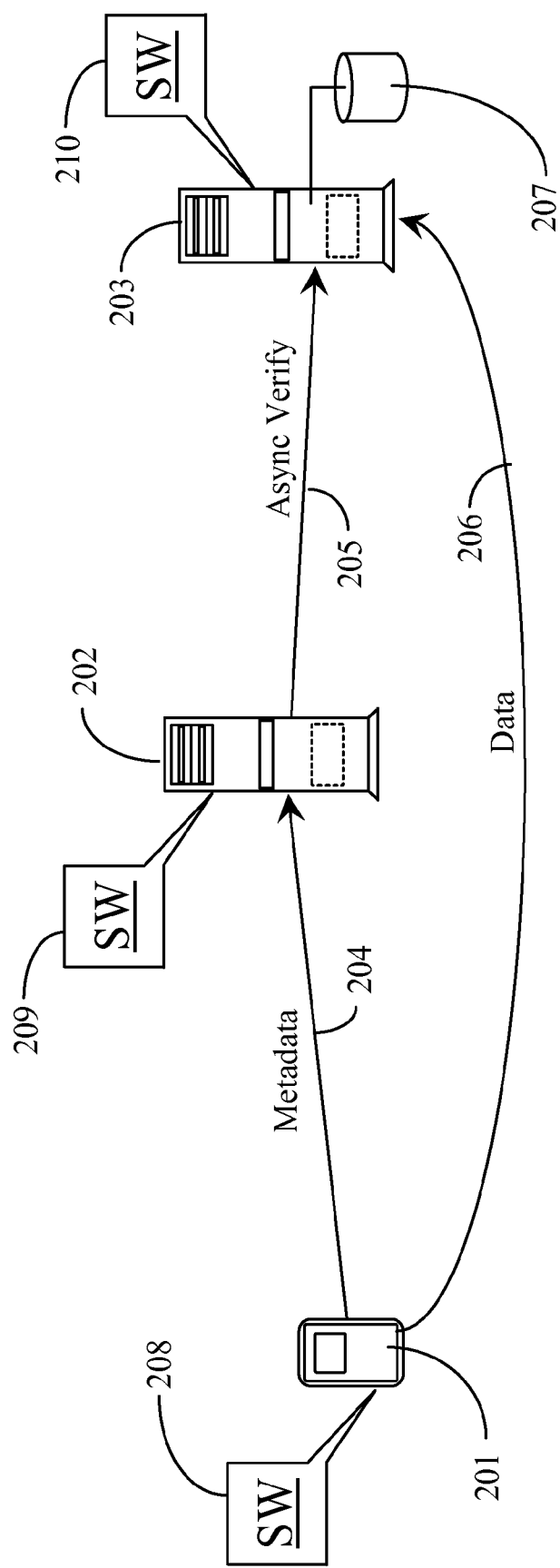
FIG. 2 is a simplified view of some of the elements of FIG. 1, and data coupling between the elements in an embodiment of the invention.

FIG. 2 is a very much simplified view of some of the elements of FIG. 1, and data coupling between the elements. FIG. 2 shows a client device 201 in data communication over a link 204 with a metadata server 202, which may open a link 205 to a data server 203 coupled to a data repository 207, and a data link 206 directly from client device 201 to Data Server 203 by which client device 201 may write data directly to the data server and repository. It is to be understood that in the context of the instant disclosure, the client is a computerized digital device, which may be employed by a user to interact with computerized appliances over a network or coupled networks to transmit, store and retrieve data.

Client device 201 represents all client devices from FIG. 1, including computers in enterprise 101 labeled as elements 106 (1–n), and mobile devices 113, 114 and 115, and any and all such devices that might be utilized to write data to data server 203, which represents server 122 in Internet network 102. Software 208 executing on client device 201 represents the SW 116, 117, 118 depicted in FIG. 1 as executing on mobile client devices, as well as SW that may be executing on devices 106 (1–n), and SW 109 executing on server 107, as this server, or another connected to LAN 105 may perform functions of the invention in data transfer as described in enabling detail below.

As described above referencing FIG. 1, server 122, coupled to data repository 123 and executing SW 127 may be located in enterprise 101, connected to LAN 105, or may be located elsewhere as well, as long as there is a network data connection between the client devices, the metadata server, which also may have alternative location, and between the metadata server and the data server. This server is represented in FIG. 2 as server 203 coupled to data repository 207 executing SW 210.

SW 208 executing on device 201 provides functions for protocol and signaling in operations for writing data to and reading data from server 203 that is coupled to data repository 207, according to embodiments of the invention described in enabling detail below. In embodiments of the invention the SW executes either in the background or is called as needed, depending upon configuration and need. The operation is tied to trigger events, such a manual and automatic save commands, and is transparent to the user of the client device.

Software 208, representing SW on all client devices, is necessarily somewhat different on different sorts of client devices, such a cellular telephone and a laptop computer, for example, to conform to certain differences in hardware and software on the different client devices, but provides a commonality of functions in writing and reading data to and from a remote data repository such as repository 207.

In an embodiment of the invention client devices rely on metadata server 202, executing SW 209 in writing data to data repository 207 through server 203. Server 203 and 207 may be considered the repository, as server 203 simply manages operation of memory 207.

A first step in a write from a client device is determining the data to write and creating a BEGIN_WRITE request comprising hashes of the data to be written. This BEGIN_WRITE request is transmitted to the metadata server 202 on path 204, which metadata server, executing SW 209, returns a list of data locations to the client device, including a set of authentication tokens for data that the metadata server has not previously seen from this client device. Client device 201 may then write its data directly to data server 203 on path 206 associated with the unique tokens directed to the data locations. The client device then writes its unique data to the data server using the unique tokens.

After the write operations client 201 sends an END_WRITE request to metadata server 202 using the list of data locations, and the metadata server makes these locations available for future reads. At this point the unique data just written is subject to a limited quarantine, which means that the writing client can continue to use that location for subsequent writes, but no other clients can use that location for writes.

After timeout for the set of authentication tokens, the quarantined data becomes available for verification. Metadata server 202 asynchronously coordinates with data server 203 managing data repository 207, verifying that the data is present and has the correct hash. If this verify step succeeds, metadata server 202 removes the quarantine, and future writes by all client devices can refer to this data. If the verify fails, metadata server 202 expands the quarantine such that no future writes can reference this data. Metadata server 202 must wait for the authentication token timeout to avoid a situation where the client device may write to a data location, the metadata server verifies the write, then the client overwrites the data location. The timeout avoids this situation. The verification never blocks client writes.

During read operations, the client device requests from the metadata server read locations on the data server. The metadata server then sends a set of authentication tokens which allow the client to directly read from the data server at specific locations. Unverified data is available for reads by all client devices, not just the device which originally wrote the data. Reads do not affect deduplication of future data or future writes.

Figure 3:
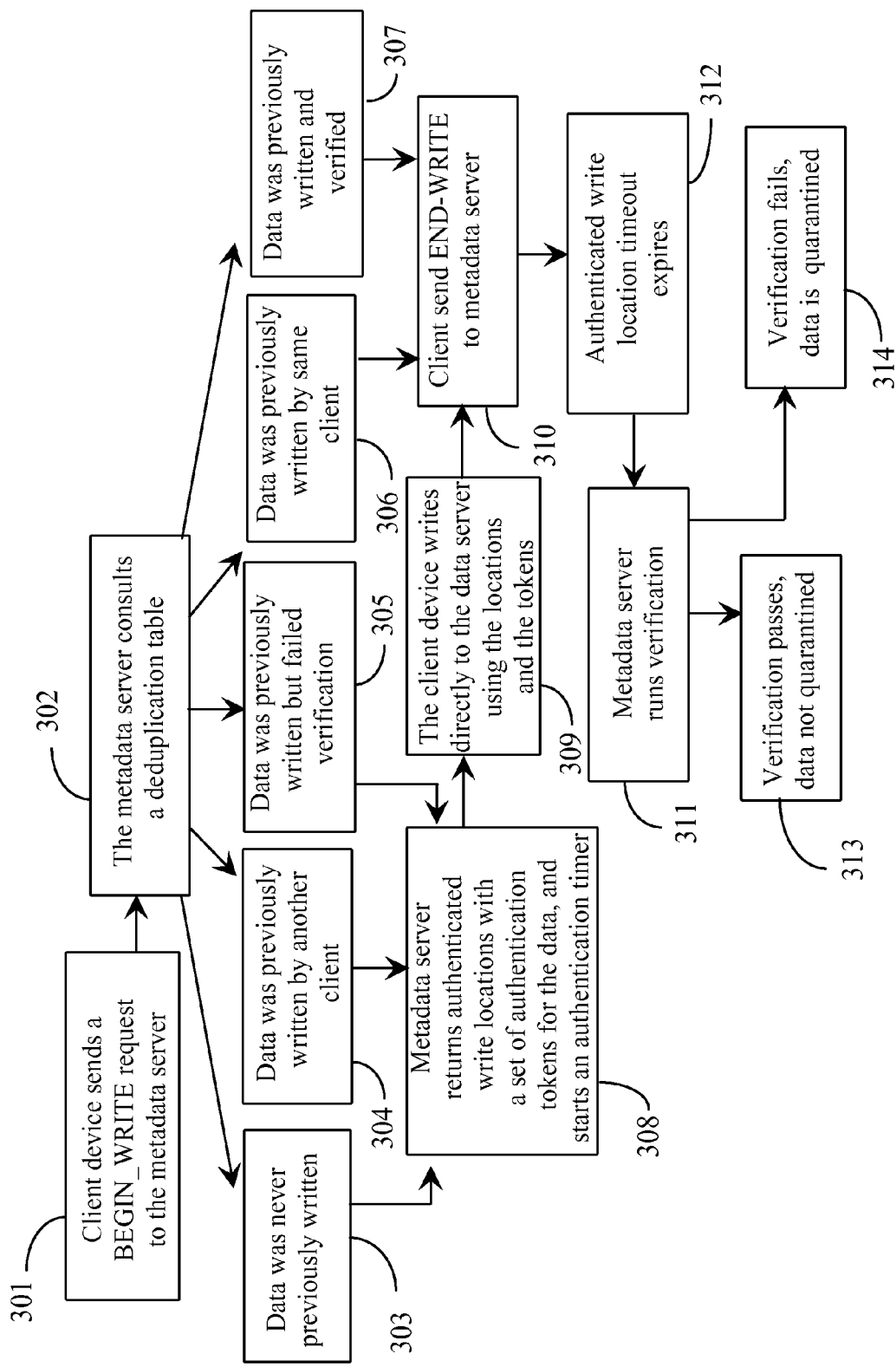
FIG. 3 is a flow diagram illustrating steps in practicing the present invention in one embodiment.

FIG. 3 is a flow diagram illustrating steps in the process just described in an embodiment of the invention. At step 301 a client device, such as device 202 in FIG. 2, sends a BEGIN_WRITE request to metadata server 202. At step 301 the metadata server consults a deduplication table and determines one of five different circumstances.

The metadata server may determine that the data was never previously written (step 303), that the date was previously written by another client device (step 304), that the data was previously written, but failed verification (step 305), that the data was, in fact, previously written by the same client device (step 306), or that the data was previously written and verified (Step 307).

In each of circumstances 303, 304 and 305, control passes to step 308. At step 308 the metadata server returns a set of authenticated write locations an including a set of authentication tokens for data, and starts an authentication timer. In this circumstance control passes to step 309, and the client writes the subject data directly to the data server on path 206, after which, at step 310 the client device sends an END_WRITE request to the metadata server.

If, at step 302 the metadata server determines from the deduplication table that the data was previously written by the same client (step 306, or that the data was previously written and verified (step 307), the metadata server returns this information to the client device. Control passes to step 310, and the client device sends the END_WRITE request back to the metadata server.

Following step 310, at step 312 the authenticated write location timeout expires and the metadata server does an asynchronous verification at step 311. If the verification at step 314 fails, the limited quarantine expands, so that no clients can use that data for writes. If verification succeeds, the quarantine is lifted, and all clients may then use that data for writes. A same client is allowed to write data that client has already written even though the metadata server has not verified the data for a limited time, separate from the authentication token timeout. This parameter in one embodiment may be tuned to provide for a client different performance and reliability characteristics.

The skilled person will understand that there are a variety of different ways that the SW may be implemented, and in some cases there may be a variance in order in the steps in the process described. There are, as well, different programming languages that might be used, and different orders in code that may be employed, still providing the functionality described. The scope of the invention is therefore limited only by the claims that follow.

The invention claimed is:

1. A method for writing client data to a data server using a metadata server, the method comprising:
receiving at the metadata server a BEGIN_WRITE request from a client, wherein the BEGIN_WRITE request includes a plurality of hashes of data to be written to the data server;
consulting a deduplication table to determine the data has not previously been written to the data server;
transmitting both a list of data locations on the data server and a set of authentication tokens for the data locations to the client, wherein the authentication tokens authorize the client to write the data identified by the hashes to the data locations, wherein the authorization tokens are associated with an authorization timeout;
receiving at the metadata server an END_WRITE request, wherein the END_WRITE request indicates the client has finished writing the data to the data server;
subjecting the data written to the data server to a quarantine, wherein additional clients can not write to the data locations during the quarantine;
verifying from the metadata server that the data is present on the data server when the authorization timeout has expired; and
removing the quarantine in response to a passing verification.

2. A system for writing client data to a data server using a metadata server comprising a non-transitory computer readable storage medium and a processor executing instructions for:
receiving at the metadata server a BEGIN_WRITE request from a client, wherein the BEGIN_WRITE request includes a plurality of hashes of data to be written to the data server;
consulting a deduplication table to determine the data has not previously been written to the data server;
transmitting both a list of data locations on the data server and a set of authentication tokens for the data locations to the client, wherein the authentication tokens authorize the client to write the data identified by the hashes to the data locations, wherein the authorization tokens are associated with an authorization timeout;
receiving at the metadata server an END_WRITE request, wherein the END_WRITE request indicates the client has finished writing the data to the data server;
subjecting the data written to the data server to a quarantine, wherein additional clients can not write to the data locations during the quarantine;
verifying from the metadata server that the data is present on the data server when the authorization timeout has expired; and
removing the quarantine in response to a passing verification.

3. A computer program product for writing client data to a data server using a metadata server, the computer program product comprising a non-transitory computer readable medium encoded with computer executable program, the code enabling:
receiving at the metadata server a BEGIN_WRITE request from a client, wherein the BEGIN_WRITE request includes a plurality of hashes of data to be written to the data server;
consulting a deduplication table to determine the data has not previously been written to the data server;
transmitting both a list of data locations on the data server and a set of authentication tokens for the data locations to the client, wherein the authentication tokens authorize the client to write the data identified by the hashes to the data locations, wherein the authorization tokens are associated with an authorization timeout;

receiving at the metadata server an END_WRITE request, wherein the END_WRITE request indicates the client has finished writing the data to the data server;

subjecting the data written to the data server to a quarantine, wherein additional clients can not write to the data locations during the quarantine;

verifying from the metadata server that the data is present on the data server when the authorization timeout has expired; and removing the quarantine in response to a passing verification.

* * * * *